May 29, 1956  I. M. BISSONNETTE ET AL  2,747,739
REMOVABLE FABRIC TYPE STRAINER
Filed April 30, 1954  2 Sheets-Sheet 1
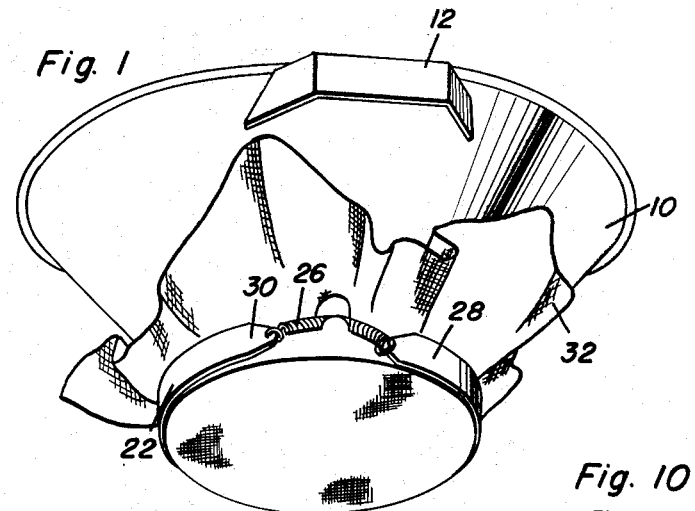
Fig. 1
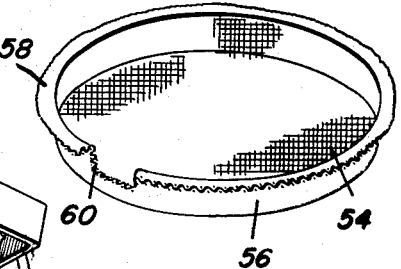
Fig. 10
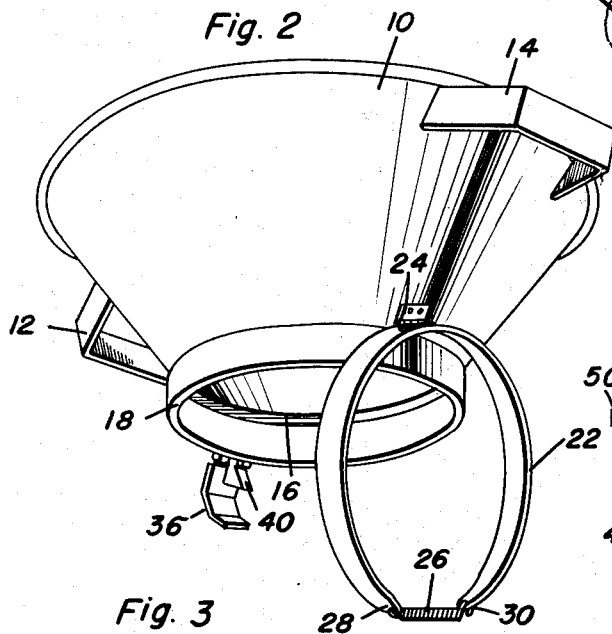
Fig. 2
Fig. 4
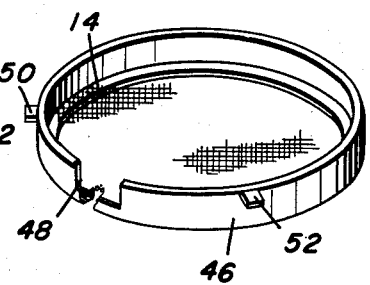
Fig. 3
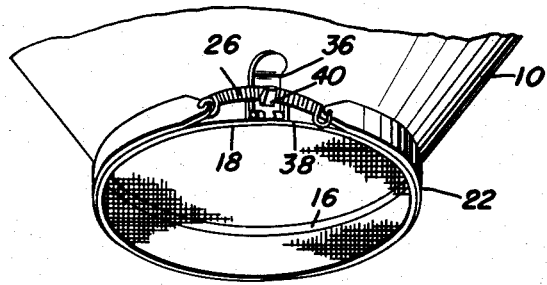
Irving M. Bissonnette
Harold E. Bissonnette
INVENTORS.
BY *[signatures]*
Attorneys May 29, 1956     I. M. BISSONNETTE ET AL     2,747,739
REMOVABLE FABRIC TYPE STRAINER
Filed April 30, 1954                          2 Sheets-Sheet 2
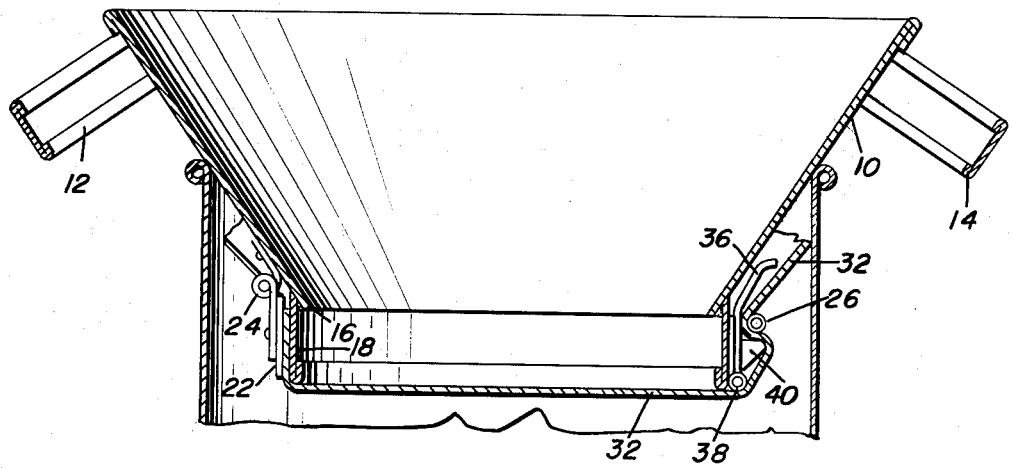
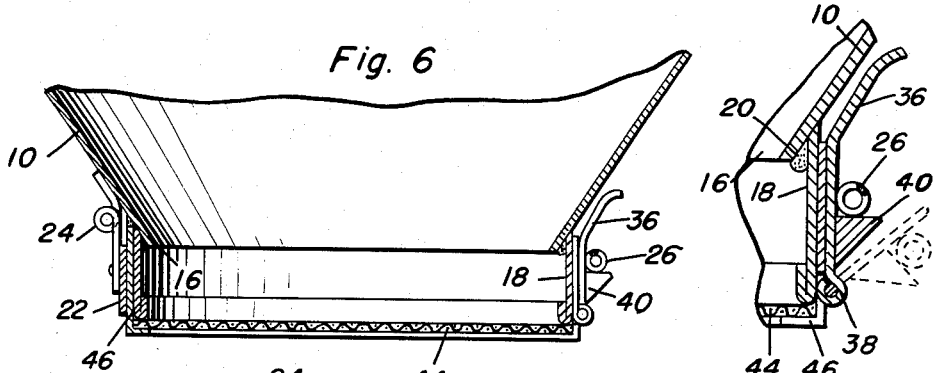
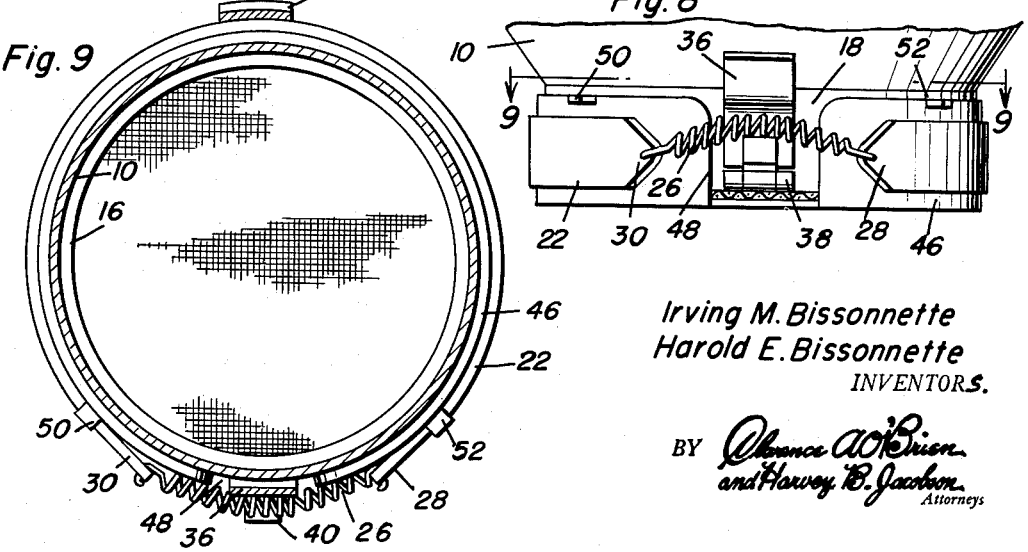
Irving M. Bissonnette
Harold E. Bissonnette
INVENTORS.
BY *Clarence A. O'Brien*
*and Harvey B. Jackson*
Attorneys

United States Patent Office 2,747,739
Patented May 29, 1956

2,747,739

REMOVABLE FABRIC TYPE STRAINER

Irving M. Bissonnette and Harold F. Bissonnette, Chicago, Ill.

Application April 30, 1954, Serial No. 426,708

3 Claims. (Cl. 210—159)

This invention relates to a strainer and particularly to a strainer for separating solids from liquids and particularly adapted to strain paint and having a plurality of substitutable strainers therein.

In the mixing of paint, calcimine and many other materials, it is frequently desirable to be able to remove the unmixed lumps or solids from the material so that the mixed liquid will be properly flowable in a brush or for other purposes.

Heretofore, various strainers have been utilized for this purpose with the difficulty that after a strainer has been used for a short time, it becomes clogged up and must be thrown away. The present invention eliminates this difficulty by providing a strainer body having replaceable strainer elements therein which may be readily renewed or discarded as may be desired so that the strainer remains in operative condition.

In a construction according to the invention, the liquid retaining body is provided with an aperture about which is an upstanding rim on which various types of screens or filters may be placed and a filter retaining band is constructed as a split band and hingedly connected to the body adjacent the upstanding rim for swinging movement into and out of embracing relation with the rim, and a spring is placed across the end of the split band for resiliently retaining it against the screen or filter elements to firmly retain them on the rim and to prevent leakage therealong. A latch is hingedly mounted on the rim adjacent the outer edge thereof and is provided with a lug which engages with the split band to retain it on the rim or is operable to eject the band from the rim so that the screen or filter element may be readily removed or renewed.

It is accordingly an object of the invention to provide an improved strainer.

It is a further object of the invention to provide a strainer to which a plurality of different types of strainers may be attached.

It is a further object of the invention to provide a strainer having replaceable strainer elements.

It is a further object of the invention to provide a means of retaining a strainer element on a strainer.

Other objects and many of the attendant advantages of the present invention will be apparent from the following detailed description taken in conjunction with the accompanying drawing in which:

Figure 1 is a perspective view of a strainer with a cloth strainer element in operative relation thereon;

Figure 2 is a perspective view of the strainer with the strainer element removed and the retainer band in open position;

Figure 3 is a perspective view of a portion of the strainer showing the retainer band in locked position without the interposition of a strainer;

Figure 4 is a strainer element for mounting on the strainer;

Figure 5 is a sectional elevation through the strainer of Figure 1 showing the relation and construction of the parts thereof;

Figure 6 is a partial sectional elevation similar to Figure 5 but showing the strainer of Figure 4 in position thereon;

Figure 7 is a fragmentary sectional elevation through the latching mechanism;

Figure 8 is a plan view of the latching mechanism in locked position;

Figure 9 is a cross-section through the device substantially upon the plane indicated by the section line 9—9 of Figure 8; and Figure 10 is a perspective view of a modified screen according to the invention.

In the exemplary embodiment according to the invention, a substantially conical body 10 is provided with handles 12 and 14.

The body 10 is provided with an aperture 16 adjacent the bottom thereof and an upstanding rim 18 is secured about the aperture 16 by any suitable means, such as soldering or welding 20.

A split collar 22 is secured to the body 10 by means of a hinge 24 secured to the body 10 adjacent the rim 18. The hinge 24 being so located that the split band 22 may swing into or out of engaging relation with the rim 18.

The split collar 22 is provided with a biasing spring 26 connected between the ends 28 and 30 of the split band 22. The spring 26 having sufficient tension to bias the split band 22 into firm retaining relation with a strainer member, such as a cloth 32, or other type strainer mounted on the rim 18.

A latch member 36 is secured adjacent the outer end of the rim 18 by means of a hinge 38. The latch 36 being provided with a lug 40 adapted to receive the spring 26 to retain the split band 22 in engaging or embracing relation with the rim and the screens thereon.

In order to secure a cloth such as the device 32 on the rim 18, a split collar is opened by swinging the latch 36 downwardly so that the split collar 22 may be in depending relation, as shown in Figure 2. The cloth 32 is then applied to the rim, and the latch 36 which is in closed position. The split collar 22 is then placed in engaging relation around the cloth 32 and the rim 18, with the spring 26 being received on the lug 40 so that the tension of the spring 26 will retain the cloth firmly against the rim 18 to prevent the passage of fluid therealong.

Instead of utilizing a cloth 32 as the strainer element, the strainer may be provided with a screen 44 mounted in a suitable skirt 46 which may conveniently be any sheet material, such as sheet metal. The skirt 46 will be provided with a cut-out portion 48 so that the skirt 46 may readily pass around the latch 36 and be received thereon and preferably the skirt 46 is provided with lugs 50 and 52 which engage over the top of the split collar 22 to help maintain the screen in position on the rim 18.

Instead of providing the skirt 46 as a separate sheet of material, the screen 54 may be provided with a skirt 56 which is constructed by turning up or otherwise shaping a portion of the screen 54 to provide the desired skirt, and the entire skirt may be provided with a lip 58 which will overlie the split collar 22 to retain the screen 54 in position on the rim 18. The skirt 56 will be provided with a cut-out portion 60 to embrace the latch 36 so that the device may be readily inserted on the rim 18 and past the latch 36.

In the operation of the construction according to the invention, suitable screens, such as the cloth 32 or the screen elements 44 or 54, will be readily applied to the rim 18 and latched thereon by means of the latch 36 having the latch dog 40 to receive the tension spring 26 so that the screen member will be retained on the rim 18 by the split band 22. Any desired material may then be poured into the strainer body, and when sufficient material has been worked to clog or otherwise disable the screen, the screen may be readily removed and another screen substituted therefor..

For purposes of exemplification, a particular embodiment of the invention has been shown and described according to the best present understanding thereof. However, it will be apparent to those skilled in the art that various changes and modifications in the construction and arrangement of the parts thereof may be readily resorted to without departing from the true spirit and scope of the invention.

What is claimed as new is as follows:

1. A paint strainer comprising a body having an aperture, a depending collar about said aperture, a split screen supporting band hingedly mounted on said body adjacent one side of said collar and adapted to move into and out of embracing relation with said collar, a spring connected between the ends of said split band, a spring engaging lug mounted on said collar between the ends of said split band for latching said band in embracing relation.

2. A paint strainer comprising a body having an aperture, a depending collar about said aperture, a split screen supporting band hingedly mounted on said body adjacent one side of said collar and adapted to move into and out of embracing relation with said collar, a spring connected between the ends of said split band, a latch member hingedly mounted on said collar between the ends of said band and engageable under said spring to latch said band in embracing relation, a screen telescopingly engaging said collar, said split band retaining said screen on said collar.

3. A paint strainer comprising a body having an opening therein, a rim about said opening, a hinge mounted on said body adjacent to said rim, a split collar mounted on said hinge and adapted to move into and out of engaging relation with said rim, a latch member hingedly mounted on said rim, a screen, a skirt on said screen extending in telescoping relation with said rim, said split collar retaining said skirt on said rim, a spring connected between the ends of said split collar, said latch being disposed between said ends and engaging said spring to retain said split collar in position on said rim, said skirt having a cut-out portion straddling said latch and adapted to prevent fouling of said latch by said skirt.

References Cited in the file of this patent

UNITED STATES PATENTS

| | | |
|---|---|---|
| 1,229,857 | Alyea | June 12, 1917 |
| 1,421,622 | Van Ness | July 4, 1922 |
| 1,715,601 | Horne | June 4, 1929 |
| 1,786,500 | McGonigal | Dec. 30, 1930 |

FOREIGN PATENTS

| | | |
|---|---|---|
| 176,739 | Great Britain | Mar. 16, 1922 |